United States Patent [19]

Lang et al.

[11] Patent Number: 4,523,818
[45] Date of Patent: Jun. 18, 1985

[54] OCULAR EYECUPS FOR WEARERS OF GLASSES

[75] Inventors: Walter H. Lang; Joachim Hornschu, both of Konigsbronn, Fed. Rep. of Germany

[73] Assignee: Carl-Zeiss-Stiftung, Heidenheim/Brenz, Oberkochen, Fed. Rep. of Germany

[21] Appl. No.: 502,725

[22] Filed: Jun. 9, 1983

[30] Foreign Application Priority Data

Jun. 24, 1982 [DE] Fed. Rep. of Germany ....... 3223538

[51] Int. Cl.$^3$ .............................................. G02B 23/16
[52] U.S. Cl. .................................................. 350/579
[58] Field of Search ............... 350/579, 580, 589, 318, 350/255, 563, 518, 577, 545–556, 514, 515, 516

[56] References Cited

FOREIGN PATENT DOCUMENTS 572544 10/1945 United Kingdom ................ 350/589
687383 2/1953 United Kingdom ................ 350/579

Primary Examiner—Jon W. Henry
Attorney, Agent, or Firm—Hopgood, Calimafde, Kalil, Blaustein & Judlowe

[57] ABSTRACT

For non-fatiguing observation through microscope eyepieces, the invention contemplates continuously displaceable eyecups for adjustment of pupil coincidence. The simple mechanical structure is based on force-fitted connection of one part of the eyecup to the eyepiece housing, together with guidance of another part parallel to the optical axis.

2 Claims, 3 Drawing Figures

OCULAR EYECUPS FOR WEARERS OF GLASSES

BACKGROUND OF THE INVENTION

The present invention relates to eyecups for adjustment of pupil coincidence for oculars of optical viewing instruments.

For high-precision optical instruments, so-called eyeglass oculars are used to enable a person who wears glasses to bring the pupil of his eye into the exit pupil of the ocular, so that he may thereby see the entire field of view. These eyeglass oculars are so designed that their exit pupils lie 20 to 24 mm above the ocular. In the case of normal ocular, the exit pupil is 10 to 12 mm above the ocular.

It has been the practice, in order to provide oculars which are suitable both for persons with normal eyesight and for persons who wear glasses, to provide the ocular with an eyecup of flexible material which can be rolled up. For viewing without eyeglasses, the eyecups are extended to their entire length of about 12 mm so that the exit pupil is brought into a favorable position with respect to the eyes. People who wear eyeglasses roll the eyecups down and thus have a full view of the entire field of vision with the exit pupil located a distance away. However, a standardized eyecup of the character indicated will not be of length to enable an optimal condition for users whose eye-exit pupil differs from the accepted average value, for calculation of the ocular. For brief observations, as for example through binoculars, the eye can adjust itself somewhat by adaptation to this condition. However, in jobs which require lengthy and high concentration, such as is necessary, for example, in microsurgical operations with the use of an operating microscope, the continuous need to adapt the eye is fatiguing for the observer.

Continuously axially adjustable eyecups are known from British Pat. No. 112,989; they are intended to permit adjustment for coincidence between the exit pupil of the ocular and the entrance pupil of the eye of the observer. These known adjustable eyecups consist of double-walled elastic material which can be inflated to a different height by liquid or air. The eyecups are intended to be suitable for oculars of different magnification, wherein exit pupils are at different distances above the ocular. Their disadvantage is that they are expensive to manufacture and trouble-prone in use.

British Pat. No. 313,126 discloses rigid eyecups for binocular telescopes wherein the eyecups are continuously axially adjustable jointly, via an arm which is fastened to central focusing means. For modern purposes, this displacement mechanism is too expensive and too bulky in construction.

BRIEF STATEMENT OF THE INVENTION

The object of the present invention is to provide improved continuously axially displaceable ocular eyecups for adjustment of pupil coincidence, wherein the adjustment makes it possible to compensate for different eye depths of users, and wherein optimum utilization is assured for oculars with diopter equalization and/or different magnification, by adjustment of the pupil coincidence.

The invention achieves this object by providing a rigid tubular eyecup which is snap-fitted to the ocular housing; a friction element is provided in order to retain a selected position, within a continuous range of axial displacement, and the eyecup includes means for keyed engagement to the ocular housing, to provide eyecup guidance parallel to the axis, such guidance being anti-rotational with respect to the ocular housing.

The friction element for instant adjustment may consist of a snap ring which is recessed in the ocular mount; alternatively, the lower edge of the eyecup may be so devised that upon axial displacement, it frictionally engages the ocular housing.

It will be evident to those skilled in the art that the guidance parallel to the axis, upon displacement of the eyecup, can be achieved in a technically equivalent manner by having a guide part attached to the ocular cup engage a longitudinal slot in the ocular mount.

The advantage obtained by the invention resides, in particular, in the fact that, by having enabled compensation for defective vision on the part of the user and for anatomical peculiarities of the eye, it is possible to work without fatigue for long periods of time.

DETAILED DESCRIPTION

An illustrative embodiment of the invention will be described in detail, in conjunction with the accompanying drawing, in which.

Figure 1:
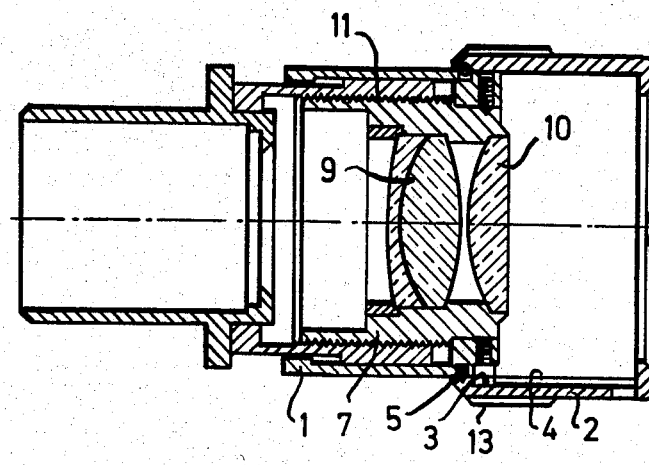
FIG. 1 is a longitudinal section through an ocular equipped with an eyecup of the invention, shown for viewing without eyeglasses, in its maximum adjusted length.

In FIG. 1, a microscope ocular includes an outer sleeve 1 and contains focusing lenses 9 and 10 for diopter equalization of the user; lenses 9 and 10 are axially adjustable via a screw thread 11, by incrementally rotating sleeve 1. An eyecup 2 is telescopically adjustable over ocular sleeve 1 and is provided with a longitudinal slot 4 which has keyed engagement with a guide part 3, mounted to the ocular sleeve 1. A snap ring 5 permits instant adjustment upon axial displacement of eyecup 2 on sleeve 1; and, in the extended position shown in FIG. 1, the snap ring engages in a corresponding depression in the eyecup. In FIG. 1, the axial range of displacement of the eyecup has been fully utilized. The bare eye 6 of the observer is at the maximum adjustable distance from the last lens 10 of the ocular. The diopter equalization is brought about by incremental rotation of the knurled knob 13.

Figure 2:
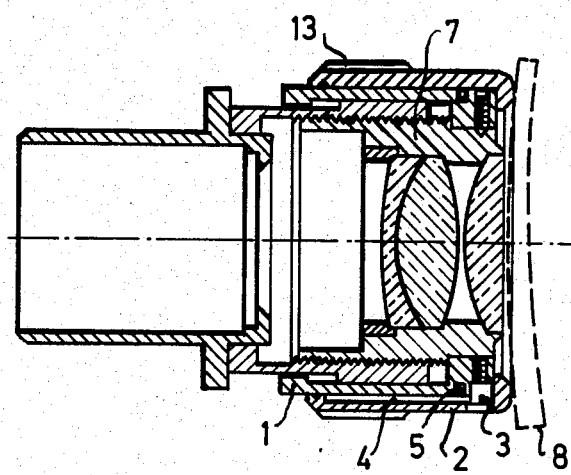
FIG. 2 is a view similar to FIG. 1, to illustrate the position for viewing by a person wearing eyeglasses.

In FIG. 2, the eyecup 2 has been fully pushed back, and the eyeglass lens 8 is in contact with the eyecup. Behind the eyeglass lens 8, the eye 6 of the observer is positioned at the locus of the exit pupil of the ocular.

Figure 3:
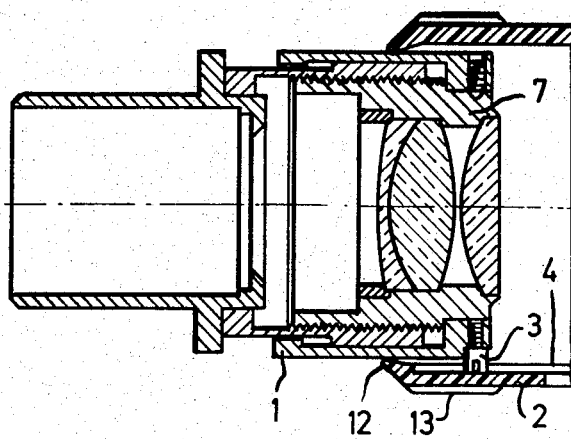
FIG. 3 is another such view, to show the same set to an intermediate length.

In FIG. 3, the eyecup 2 is adjusted for an intermediate pupil position for a viewer without glasses. The arrangement of FIG. 3 differs from that of FIGS. 1 and 2 in that, in place of the snap ring 5, the eyecup 2 is so developed at its lower end 12 (as with collet-like fingers) that it provides frictional engagement to sleeve 1 for retention of any given continuously adjustable axial positioning. The range of adjustment of the eyecup is limited by the longitudinal slot 4.

What is claimed is:

1. An eyecup for adjustment of pupil coincidence for an ocular of an optical viewing instrument, characterized by the fact that a rigid tubular eyecup (2) is adapted for sliding engagement to the housing (1) of the ocular, a snap-ring friction element (5) recessed in said housing for retaining a selected position of continuous axial adjustment, the eyecup (2) having a longitudinal slot (4) for keyed reception of at least one guide part (3) carried by the ocular housing (1).

2. An eyecup according to claim 1, wherein the snap-ring element engages a depression in the eyecup when in an extended position with respect to the housing.

* * * * *